(12) United States Patent
Andreis

(10) Patent No.: US 9,880,565 B1
(45) Date of Patent: Jan. 30, 2018

(54) TWO-STAGE VALVE

(71) Applicant: DOLPHIN FLUIDICS S.R.L., Corsico (IT)

(72) Inventor: Diego Andreis, Milan (IT)

(73) Assignee: DOLPHIN FLUIDICS S.R.L., Corsico (MI) (IT)

( * ) Notice: Subject to any disclaimer, the term of this patent is extended or adjusted under 35 U.S.C. 154(b) by 0 days.

(21) Appl. No.: 15/287,285

(22) Filed: Oct. 6, 2016

(51) Int. Cl.
*F16K 31/02* (2006.01)
*G05D 7/06* (2006.01)
*F16K 31/04* (2006.01)

(52) U.S. Cl.
CPC ........... *G05D 7/0635* (2013.01); *F16K 31/04* (2013.01); *F16K 31/02* (2013.01)

(58) Field of Classification Search
CPC ........... F16K 31/02; F16K 31/04; F03G 7/065
USPC .................................. 251/159.06, 63, 30.01
See application file for complete search history.

(56) References Cited

U.S. PATENT DOCUMENTS

| | | | | |
|---|---|---|---|---|
| 2,644,476 A * | 7/1953 | Smith | .................... | D06F 39/088 137/88 |
| 5,732,929 A * | 3/1998 | Luppino | ............... | F16K 31/404 138/42 |
| 5,738,138 A * | 4/1998 | Grunert | ................. | F16K 31/404 137/245 |
| 7,168,675 B2 * | 1/2007 | Cabuz | ..................... | F16K 31/02 251/129.01 |
| 8,000,027 B2 * | 8/2011 | Hirata | ..................... | F03G 7/065 359/694 |
| 9,630,560 B2 * | 4/2017 | Alacqua | .................. | B60R 1/087 |
| 9,664,182 B2 * | 5/2017 | Nicolini | .................. | F03G 7/065 |
| 2011/0100487 A1 * | 5/2011 | Chen | ........................ | F16K 31/40 137/487.5 |
| 2012/0151913 A1 | 6/2012 | Foshansky | | |

FOREIGN PATENT DOCUMENTS

EP 2239486 A1 10/2010
WO 2015015370 A1 2/2015

* cited by examiner

*Primary Examiner* — Umashankar Venkatesan
(74) *Attorney, Agent, or Firm* — King & Schickli, PLLC

(57) ABSTRACT

The present invention describes a two-stage valve comprising a first stage constituted by a main valve body provided with at least one fluid inlet duct and with at least one fluid outlet duct, between which is interposed at least one shutter element configured to put selectively in fluid communication such ducts. The valve comprises a second stage constituted by a pilot valve body provided with at least one fluid inlet duct and with at least one fluid outlet duct, between which is interposed at least one shutter element configured to put selectively in communication such ducts. The opening of the shutter element of the pilot valve generates a fluid flow passing through the fluid inlet duct of the pilot valve and the fluid outlet duct of the pilot valve, the pressure of such a fluid flow generating the opening of the shutter element of the main valve. The shutter element of the pilot valve is actuated by an actuator device comprising at least one wire made of a shape-memory alloy, capable of applying a force onto the shutter element of the pilot valve as a consequence of a temperature variation determined by the Joule effect by the flow of an electric current through such a wire.

15 Claims, 7 Drawing Sheets

TWO-STAGE VALVE

FIELD OF THE INVENTION

The present invention refers in general to a control device for a hydraulic circuit and, more specifically, to a two-stage valve configured to detect and manage the essential parameters of a fluid flowing in a hydraulic circuit.

BACKGROUND OF THE INVENTION

A hydraulic circuit comprises two essential components that carry out the conversion of mechanical energy into hydraulic energy and vice-versa. These two components consist of a pump and a motor. In a hydraulic circuit, in addition to these two components, it is required for there to be devices that carry out a control action on the fluid. Due to operating requirements of the circuits it is thus necessary to intervene on the essential hydraulic magnitudes of the fluid, in other words pressure and flow rate, as well as on the direction of the fluid flow.

The devices proposed to perform this control function of the fluid are called valves, which can be grouped into three main categories:
  directional valves;
  flow rate valves;
  pressure valves.

In general, the above categories of valves can only take up two states: actuated and not actuated. This means that the state taken up by the actuator of the valve, typically consisting of a solenoid, can cause the closure and the complete opening of the valve shutter, but it does not allow any intermediate position of such a shutter.

Moreover there are continuous positioning valves, like proportional valves, which are able to take up precise intermediate positions between the completely open position and the totally closed position of the shutter. This way of operating makes it possible not only to control the direction of the flow, but also to adjust both the flow rate and possibly the pressure thereof downstream of the shutter through the load losses caused by the shutter itself.

In the panorama of valves available, a last important category of directional and/or proportional valves concerns two-stage valves. A two-stage valve substantially consists of two directional valves joined in a single valve body. The control system of the two-stage valve, typically consisting of a solenoid, acts on a small directional valve, or pilot valve, which uses the fluid of the hydraulic circuit to control the main valve. This type of two-stage valve becomes necessary in large sized valves, which operate in high pressure hydraulic circuits, because the great forces required by the direct actuation of the shutter could not be generated only by the solenoid. In two-stage valves, on the other hand, the solenoid provides sufficient force to actuate only the pilot stage, of small size, which through suitable pilot lines hydraulically controls the shutter of the main valve.

A typical scheme of a two-stage valve is shown in FIGS. 1 and 2. In FIG. 1 the pilot valve is indicated with reference numeral 100, whereas the main valve is indicated with reference numeral 102. The pilot valve 100 is provided with an actuator device 104, for example consisting of a solenoid. By energising the solenoid 104, the shutter 106 of the pilot valve 100 moves axially to the left with reference to FIG. 1. This allows the fluid, conveyed through suitable channels, to hydraulically actuate the shutter 108 of the main valve 102, axially moving it to the right with reference to FIG. 1.

A known two-stage valve, therefore, is particularly bulky and heavy, since it consists of two distinct valves interconnected through suitable channels. In addition, although it is provided with an actuator that controls only the shutter of the pilot valve, a known two-stage valve in any case consumes a substantial amount of electrical energy in order to be able to operate correctly.

A known two-stage valve, in particular a two-stage valve with on/off function, is described in document EP 2 239 486 A1. Another known two-stage valve is described in document US 2012/0151913 A1.

SUMMARY OF THE INVENTION

The purpose of the present invention is therefore to make a two-stage valve, both with on/off function, and with proportional function, which is able to solve the aforementioned drawbacks of the prior art in an extremely simple, cost-effective and particularly functional manner.

In detail, a purpose of the present invention is to make a two-stage valve that allows a substantial reduction in size and weight with respect to a conventional two-stage valve.

Another purpose of the present invention is to make a two-stage valve with valve normally closed functionality, which thus has the ability to autonomously interrupt the flow at the moment when there is no electrical power supply.

A further purpose of the present invention is to make a two-stage valve that is able to reduce the electrical power and the consumption with respect to a conventional two-stage valve.

Yet another purpose of the present invention is to make a two-stage valve that is able to detect and manage the essential parameters of the fluid flowing in the hydraulic circuit in which the valve itself is inserted.

These and other purposes according to the present invention are accomplished by making a two-stage valve as outlined in claim 1.

Further characteristics of the invention are highlighted by the dependent claims, which are an integral part of the present description.

In general, the two-stage valve according to the present invention is provided with a pilot stage that comprises an actuator device made of a shape-memory alloy (SMA), typically consisting of a wire of very small sections (between 20 and 500 micron in diameter). The application, on a two-stage valve, of an actuator device made of a shape-memory alloy is particularly advantageous because, thanks to this technology, it is possible to obtain a pilot valve of very small dimensions and therefore easy to integrate in the main valve body without modifying the dimensions thereof.

The fact that the two-stage principle is exploited and, consequently, that much smaller actuation forces of the shutter have to be managed, with respect to those that there would be in direct actuation conditions of the valve, presumes that SMA actuators can be used with very thin wires and therefore that are very fast. This also makes it possible to exceed the typical maximum operating frequency for a SMA actuator device, which is about 1 Hz, even by a factor of 10 (thus reaching the final frequency of 10 Hz).

Moreover, the two-stage valve according to the present invention is able to interrupt the fluid flow autonomously, even in the absence of an electrical power supply. This is due to the fact that inside the pilot stage a contrast element of the actuator piston acts that takes the pilot stage back into the closing condition at the moment when the electrical power supply of the shape memory element stops.

The two-stage valve according to the present invention makes it possible to obtain a pilot stage perfectly integrated in the valve body and, therefore, with low volumes. The two-stage valve according to the present invention is also able to control high flow rates and pressures, absorbing a negligible electric power with respect to the hydraulic power.

In addition, a proportional control based on a SMA actuator device makes it possible to reach high levels of precision in the modulation of the pilot flow, even with very limited ducts and flow rates. This makes it possible to manage the indirect proportional modulation of the flow on the main stage of the valve.

Since the two-stage valve according to the present invention has a component made of a shape-memory alloy as actuator device for managing the fluid, through the pilot stage, it is intrinsic to use an electronic control board that manages the current needed to move the SMA wire. As already stated, the control can also be of the proportional type, thus providing the possibility of modulating the flow of the pilot fluid to be managed in a linear manner.

The electronic control board of the two-stage valve is configured to process, indirectly and thanks to the properties of the shape-memory alloy, some intrinsic parameters of the fluid, like for example the pressure, the flow rate and the temperature. Indeed, thanks to the fact that through the reading of the electrical resistance of the SMA wire it is possible to obtain the length of the wire itself and therefore the actual opening position of the valve, through the reading of the energy injected it is possible to understand the force with which the wire is acting and therefore indirectly the pressure of the fluid. Moreover, considering that the total amount of energy need to reach the transition of the shape-memory alloy is also a function of the temperature of the SMA actuator device, it will be simple to make these parameters available without needing the use of specific sensors on the two-stage valve.

The same electronic control board of the two-stage valve can also integrate a wireless remote communication module (for example with Wi-Fi technology) configured to make the aforementioned "field" parameters of the fluid available. Such a remote communication module can interface and therefore can communicate wirelessly with portable devices, such as smartphones, tablets or similar, or can interface with the internet and therefore communicate with remote terminals via web.

BRIEF DESCRIPTION OF THE DRAWING FIGURES

The characteristics and advantages of a two-stage valve according to the present invention will become clearer from the following description, given as an example and not for limiting purposes, referring to the attached schematic drawings, in which.

DETAILED DESCRIPTION OF THE INVENTION

Figure 2:
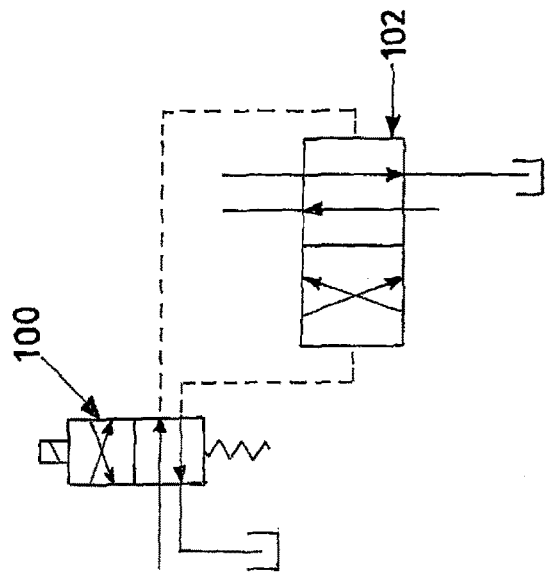
FIGS. 1 and 2 show respective schemes of a two-stage valve according to the prior art.

With reference to the figures, some embodiments of the two-stage valve according to the present invention are shown, wholly indicated with reference numeral 10. The two-stage valve 10 comprises a first stage, constituted by a main valve body 12 provided with at least one fluid inlet duct 14 for inletting fluid into the main valve and with at least one fluid outlet duct 16 for outletting fluid out from the main valve. Between the fluid inlet duct 14 of the main valve and the fluid outlet duct 16 of the main valve at least one shutter element 18 of the main valve is interposed, configured to put selectively in fluid communication such a fluid inlet duct 14 of the main valve with such a fluid outlet duct 16 of the main valve.

The two-stage valve 10 also comprises a second stage, constituted by a pilot valve body 20 provided with at least one fluid inlet duct 22 for inletting fluid into the pilot valve and with at least one fluid outlet duct 24 for outletting fluid out from the pilot valve. The fluid inlet duct 22 of the pilot valve is put in fluid communication with the fluid inlet duct 14 of the main valve, whereas the fluid outlet duct 24 of the pilot valve is put in fluid communication with the fluid outlet duct 16 of the main valve.

Between the fluid inlet duct 22 of the pilot valve and the fluid outlet duct 24 of the pilot valve at least one shutter element 26 of the pilot valve is interposed, configured to put selectively in fluid communication such a fluid inlet duct 22 of the pilot valve with such a fluid outlet duct 24 of the pilot valve. In this way, as will be specified more clearly hereinafter, the opening of the shutter element 26 of the pilot valve generates a fluid flow passing through the fluid inlet duct 22 of the pilot valve and the fluid outlet duct 24 of the pilot valve, the pressure of such a fluid flow generating the opening of the shutter element 18 of the main valve.

The shutter element 26 of the pilot valve consists of a piston movable with rectilinear motion under the action of an actuator device 28 comprising at least one wire 30 made of a shape-memory alloy. The wire 30 is able to apply a force, preferably a traction force, onto the shutter element 26 of the pilot valve by means of the temperature variation (heating) determined by Joule effect by the passage of an electric current through the wire 30 itself.

Figure 4:
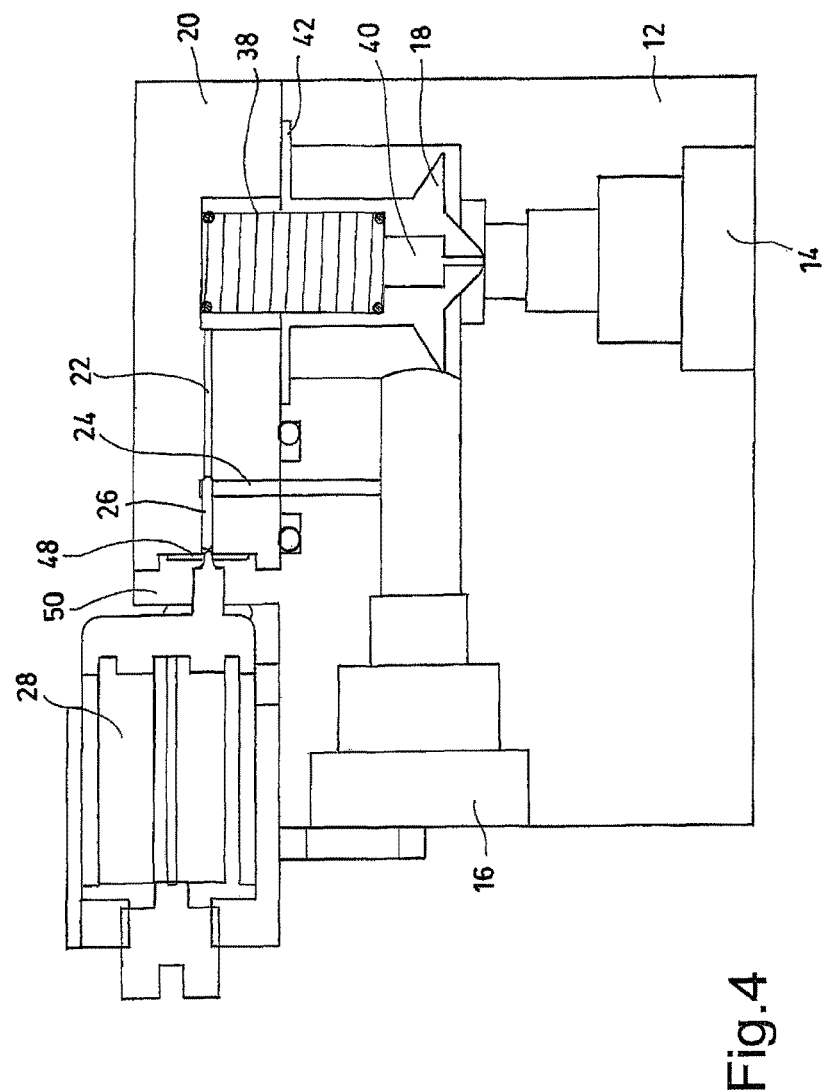
FIG. 4 is another section view of the two-stage valve of FIG. 3.
Figure 5:
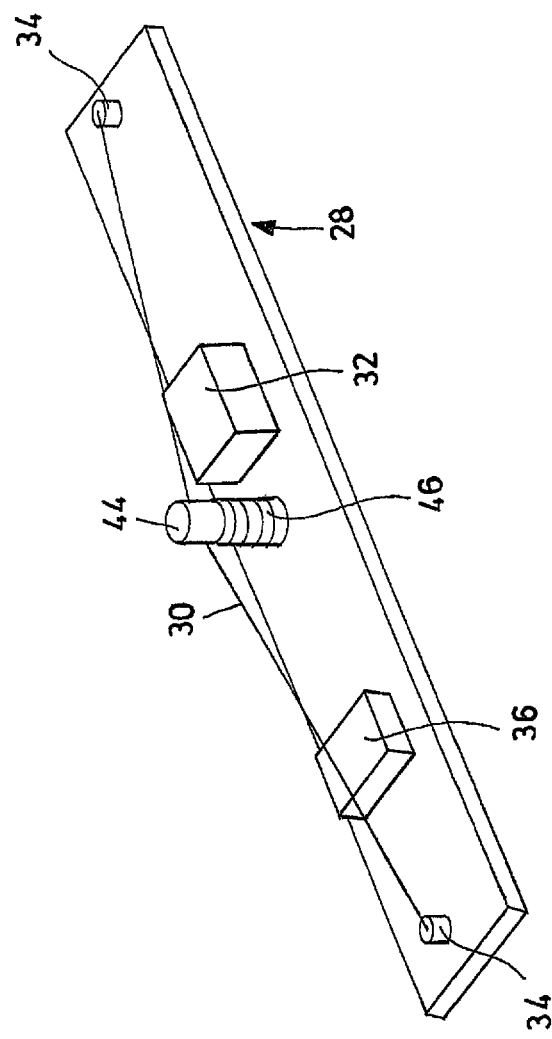
FIG. 5 is a perspective view of a possible embodiment of the actuator device of the valve of FIG. 3.

In detail, the shutter element 26 of the pilot valve is in normally closed condition when the respective actuator device 28 is not activated. The shutter element 26 of the pilot valve is kept in normally closed condition by a thruster element 44 (FIG. 5) belonging to the actuator device 28 and actuated by an elastic element 46, like for example a contrast spring operating by compression. The traction force exerted by the wire 30 made of a shape-memory alloy on the shutter element 26 of the pilot valve, where such a force is generated by the passage of electric current through the wire 30 itself, allows the elastic force generated by the elastic element 46 to be overcome, so as to take such a shutter element 26 of the pilot valve into partially or totally open condition. Between the actuator device 28 and the pilot valve body 20 an elastic separation membrane 48 is also interposed (FIG. 4), kept in compression by a squash flange 50.

In the two-stage valve 10 according to the present invention the traction force exerted by the wire 30 must compensate only the contrast force of the elastic element 46, since the pressure, and therefore the relative force exerted by the fluid, promotes the traction force itself of the wire 30. In this way, it is possible to use shape memory wires 30 with small sections, therefore with higher switching speeds, also keeping the mechanical stress of the wire 30 itself and therefore the useful life of the two-stage valve 10 under control, since it is independent of the pressure generated by the fluid.

The actuator device 28 is thus provided with an electronic control and communication system comprising a control board 32 in turn provided with respective power supply connections. The control board 32 is also provided with operative connection means 34, for example consisting of one or more mechanical and electrical crimps, with the wire 30 made of a shape-memory alloy. The control board 32 is configured to indirectly obtain determined physical parameters of the fluid through the characteristics of the wire 30 made of a shape-memory alloy. The electronic control and communication system is further provided with a wireless remote communication module 36, interfaceable via web with remote terminals and/or with portable devices and configured to make available the physical parameters of the fluid on such remote terminals and/or portable devices.

In order to verify the totally or partially open condition, or the normally closed condition, of the pilot valve, the control board 32 can be provided with means for detecting the relative position of the thruster element 44. These detecting means can consist of one or more sensors, like for example position sensors of the magnetic, capacitive, optical, Hall effect type, etc. Alternatively, these detecting means can consist of a device for reading the electrical resistance of the wire 30 made of a shape-memory alloy.

The operating principle of the two-stage valve 10 provides the shutter element 18 of the main valve, which consists of a piston movable with rectilinear motion, to be in the normally closed position pushed both by the action of a contrast spring 38, and by the pressure of the fluid flowing in the two-stage valve 10 itself. Indeed, the shutter element 18 of the main valve is internally hollow and inside it defines a balancing chamber 40 in which the fluid is under pressure when the fluid inlet duct 22 of the pilot valve is kept closed by the shutter element 26 of the pilot valve, as well as because the shutter element 18 of the main valve is equipped with a membrane 42 that externally separates the main valve body 12 and the pilot valve body 20.

At the moment at which the wire 30 made of a shape-memory alloy is actuated under traction, the at least partial opening of the shutter element 26 of the pilot valve is obtained, so that the fluid inlet duct 22 of the pilot valve is put in communication with the fluid outlet duct 24 of the pilot valve and, therefore, with the fluid outlet duct 16 of the main valve. Consequently, both the pressure inside the balancing chamber 40 of the shutter element 18 of the main valve, and the closing thrust of such a shutter element 18 of the main valve decrease. Therefore, the shutter element 18 of the main valve opens pushed by the pressure of the fluid contained in the fluid inlet duct 14 in the main valve, determining the passage of the fluid flow in the main valve body 12.

If the two-stage valve 10 is suitably sized, by modulating the stroke of the shutter element 26 of the pilot valve in a controlled manner, it is possible to obtain controlled variations of the pressure in the balancing chamber 40. Consequently, it is possible to equally proportionally modulate the stroke of the shutter element 18 of the main valve, obtaining different flow rates of the fluid flow in the main valve body 12.

The control board 32 inserted inside the actuator device 28 is provided with a modulator configured to modulate in amplitude the electric current necessary to heat the wire 30 made of a shape-memory alloy, so as to obtain the controlled displacement of the shutter element 26 of the pilot valve. Through the control board 32 and through the resistance parameters of the wire 30 made of a shape-memory alloy it is also possible to interpret the characteristic parameters of the fluid, like for example temperature, pressure and flow rate. These parameters can be made available also outside of the two-stage valve 10, in wireless mode, through the wireless remote communication module 36 belonging to the electronic control and communication system and associated with the control board 32.

Figure 6:
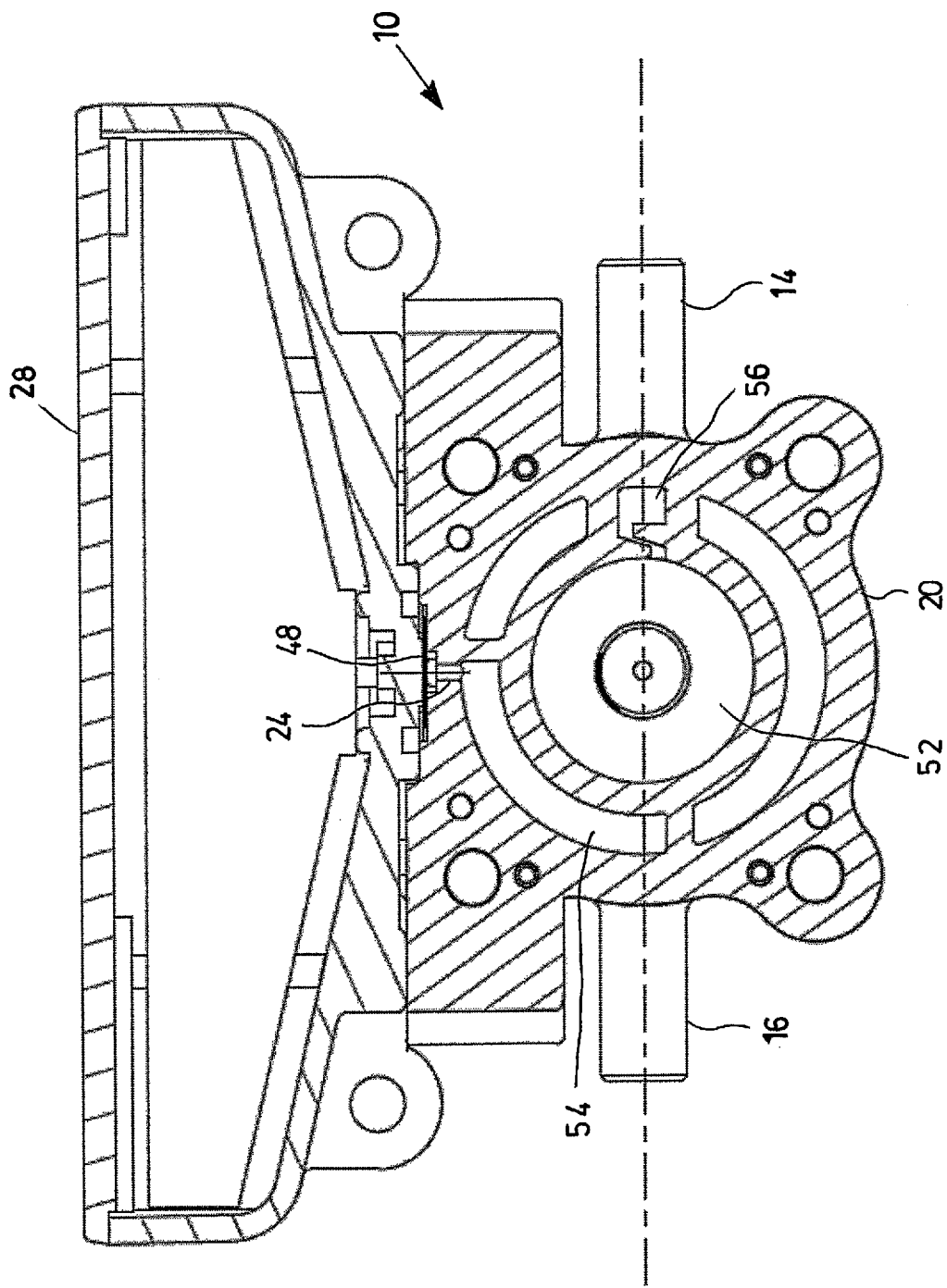
FIG. 6 is a section view of a second embodiment of the two-stage valve according to the present invention.
Figure 7:
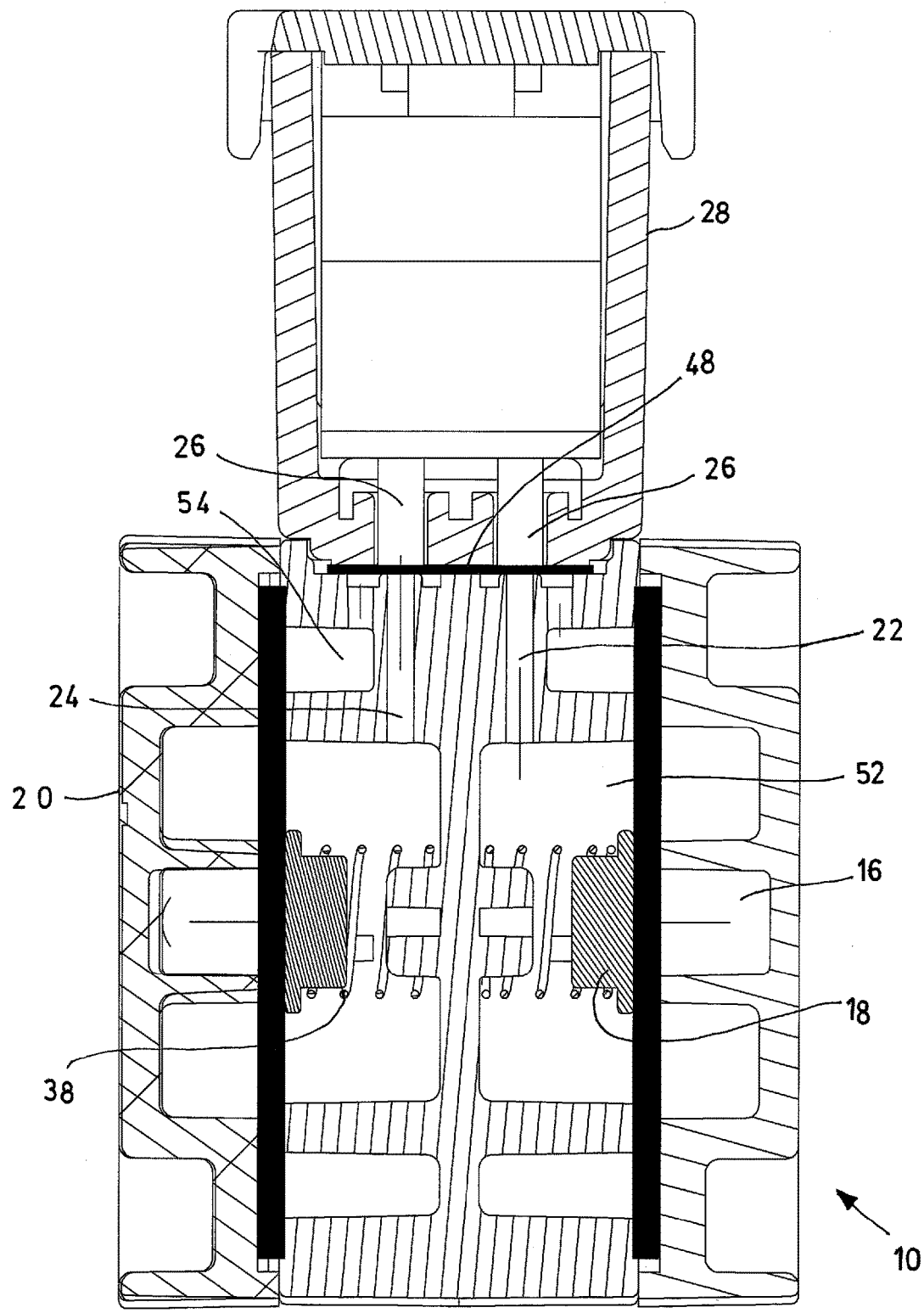
FIG. 7 is another section view of the two-stage valve of FIG. 6.
Figure 8:
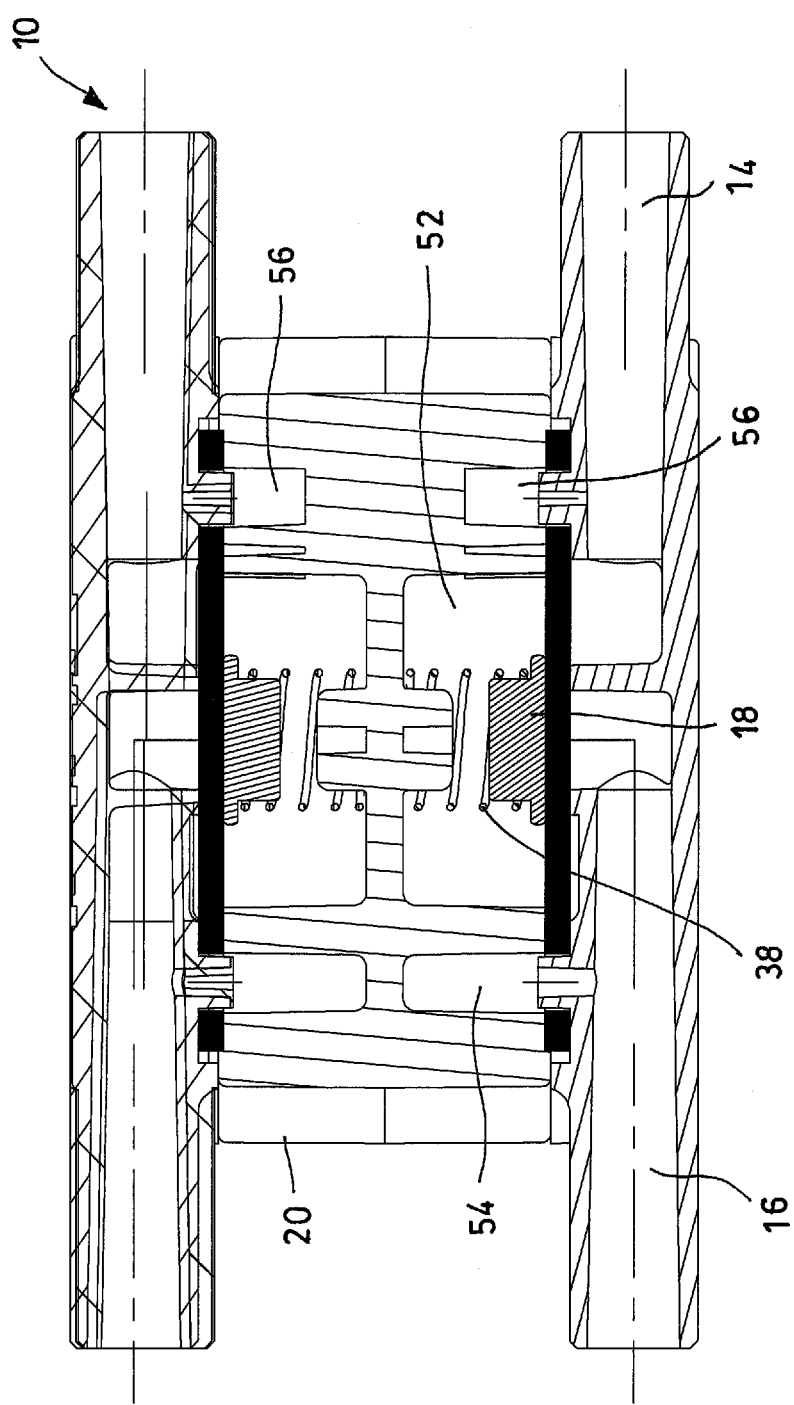
FIG. 8 is a further section view of the two-stage valve of FIG. 6.

FIG. 6 shows a second embodiment of the two-stage valve 10 according to the present invention. This two-stage valve 10 is actually a double valve, with a pair of fluid inlet ducts 22 of the pilot valve, completely independent from one another, and a corresponding pair of fluid outlet ducts 24 of the pilot valve, also completely independent from one another. Two distinct shutter elements 26 of the pilot valve are thus provided, able to be controlled independently and proportionally through the control board 32.

In this way, a single actuator device 28 is exploited, with two wires 30 made of a shape-memory alloy and independently controlled are integrated, which act on the respective shutter elements 26 of the pilot valve. For this reason, the two-stage valve 10 has a high level of integration in order to keep the dimensions as compact as possible.

In this second embodiment, moreover, the two-stage valve 10 is provided with a fluid flow distribution system arranged outside of a pilot chamber 52 that puts in fluid communication, through the interposition of a joining duct 56, the fluid inlet duct 14 of the main valve and the fluid inlet ducts 22 of the pilot valve. The fluid flow distribution system makes the two-stage valve 10 even more compact and allows the fluid inlet ducts 22 of the pilot valve and the fluid outlet ducts 24 of the pilot valve to be formed directly and at least partially on the main valve body 12. In other words, the main valve body 12 is made integral with the pilot valve body 20.

In detail, with reference in particular to FIG. 6, the fluid flow distribution system comprises a set of outer ducts that form a distribution chamber 54, having a substantially circular shape, which surrounds the central pilot chamber 52. The distribution chamber 54 is arranged in fluid connection with the elastic separation membrane 48 on which the two shutter elements 26 of the pilot valve act. These two shutter elements 26 determine the calibrated passage of fluid in order to unbalance the pressure in the pilot chamber 52.

Operatively, the fluid enters into the two-stage valve 10 through the fluid inlet duct 14 of the main valve, passes through the joining duct 56 and flows into the pilot chamber 52. The fluid is thus managed by the pilot valve through the respective inlet 22 and outlet 24 ducts. The fluid outlet ducts 24 of the pilot valve send such fluid into the distribution chamber 54 and, from here, towards the fluid outlet duct 16 of the main valve. The substantially circular shape of the distribution chamber 54 makes it possible to arrange the fluid inlet duct 14 in the main valve and the fluid outlet duct 16 of the main valve in any radial position with respect to the distribution chamber 54 itself.

Figure 1:
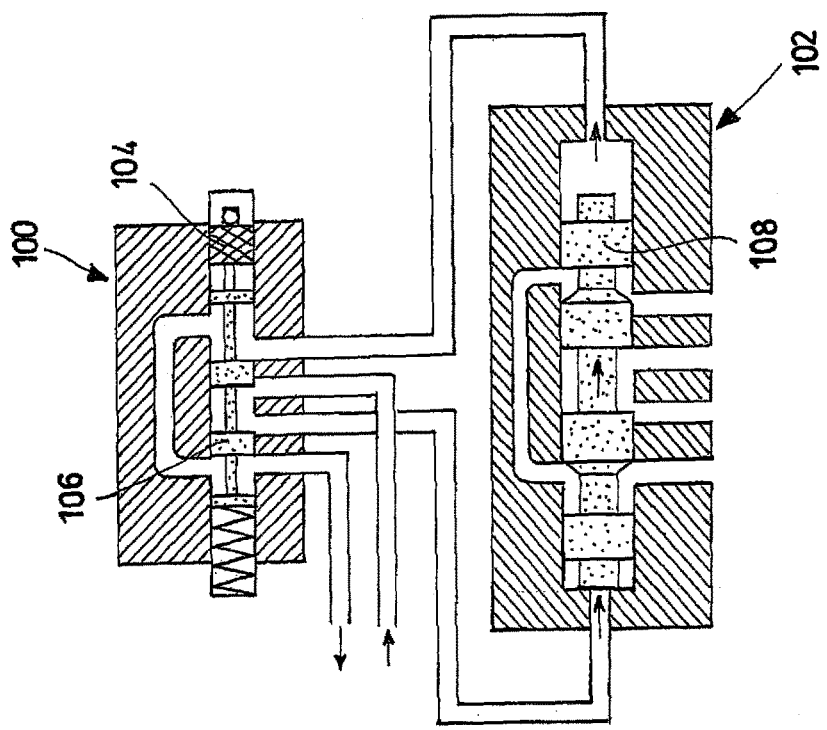
Figure 3:
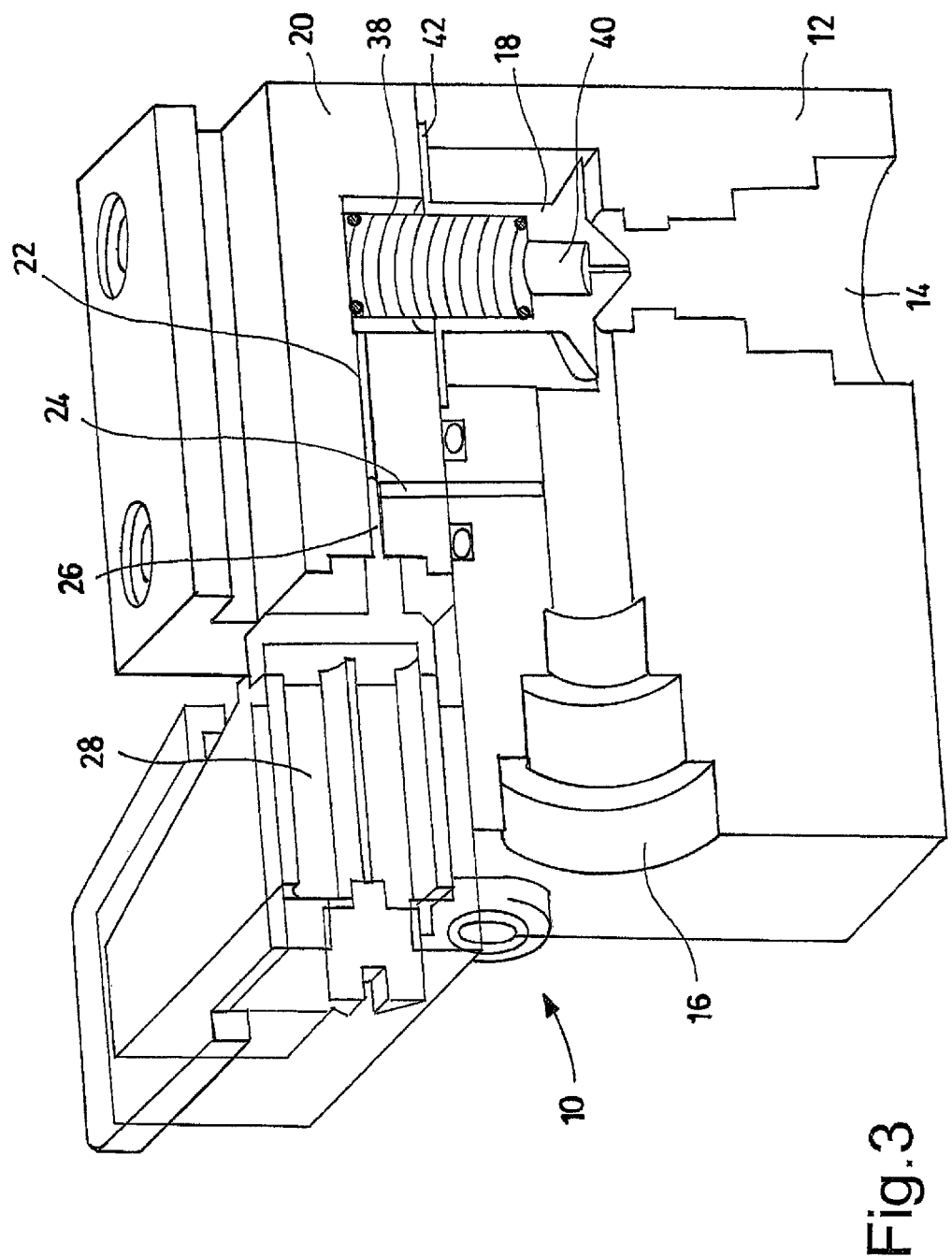
FIG. 3 is an isometric section view of a first embodiment of the two-stage valve according to the present invention.

It has thus been seen that the two-stage valve according to the present invention achieves the purposes highlighted earlier, in particular obtaining the following advantages with respect to a conventional two-stage valve like the one illustrated in FIGS. 1 and 2:

substantial reduction in size;
lighter;

constructive simplicity and cost-effectiveness;
speed of switching;
reduction of electric power and of electric power consumption;
absolute quietness;
greater precision in the proportional control of the fluid;
possibility of communicating wirelessly with remote devices;
possible presence of sensors configured to detect the essential parameters of the fluid managed, like for example pressure, flow rate and temperature.

With respect to a known two-stage valve like the one described in document EP 2 239 486 A1, the two-stage valve of the present invention also obtains the following advantages:
it is a two-stage valve with normally closed valve functionality, i.e. able to interrupt the fluid flow autonomously in the absence of electrical power supply;
precision in the proportional control of the fluid, obtainable thanks to the precision of positioning of the SMA actuator device through position reading through the variation of the electrical resistance of the shape memory wire, i.e. through reading of position sensors integrated in the electronic control system;
possibility of obtaining the parameters of the fluid, like the pressure, through the SMA wire;
possibility of having the separation membrane of the pilot stage independent from the opening and closing element of the main stage.

Moreover, the calibrated pilot hole, which determines the unbalancing of the pressures and therefore the operation of the valve, is obtained directly in the valve body and not in the mobile element. This involves a higher level of reliability and precision in the management of the pressure variation, particularly in proportional terms.

The two-stage valve of the present invention thus conceived can in any case undergo numerous modifications and variants, all of which are covered by the same inventive concept; moreover, all of the details can be replaced by technically equivalent elements. In practice, the materials used, as well as the shapes and sizes, can be whatever according to the technical requirements.

The scope of protection of the invention is therefore defined by the attached claims.

The invention claimed is:

1. Two-stage valve (10) comprising:
a first stage constituted by a main valve body (12) provided with at least one fluid inlet duct (14) for inletting fluid into the main valve and with at least one fluid outlet duct (16) for outletting fluid out from the main valve, between the fluid inlet duct (14) of the main valve and the fluid outlet duct (16) of the main valve being interposed at least one shutter element (18) of the main valve, configured to put selectively in fluid communication said fluid inlet duct (14) of the main valve with said fluid outlet duct (16) of the main valve; and
a second stage constituted by a pilot valve body (20) provided with at least one fluid inlet duct (22) for inletting fluid into the pilot valve and with at least one fluid outlet duct (24) for outletting fluid out from the pilot valve, wherein said at least one fluid inlet duct (22) of the pilot valve is put in fluid communication with the fluid inlet duct (14) of the main valve, whereas said at least one fluid outlet duct (24) of the pilot valve is put in fluid communication with the fluid outlet duct (16) of the main valve, and wherein between said at least one fluid inlet duct (22) of the pilot valve and said at least one fluid outlet duct (24) of the pilot valve is interposed at least one shutter element (26) of the pilot valve, configured to put selectively in fluid communication said at least one fluid inlet duct (22) of the pilot valve with said at least one fluid outlet duct (24) of the pilot valve, so that the opening of said at least one shutter element (26) of the pilot valve generates a fluid flow passing through said at least one fluid inlet duct (22) of the pilot valve and said at least one fluid outlet duct (24) of the pilot valve, the pressure of said fluid flow generating the opening of the shutter element (18) of the main valve,
wherein said at least one shutter element (26) of the pilot valve is actuated by an actuator device (28) comprising at least one wire (30) made from a shape-memory alloy, said at least one wire (30) being able to apply a force onto said at least one shutter element (26) of the pilot valve as a consequence of a temperature variation determined by the Joule effect by the flow of an electric current through said at least one wire (30), the two-stage valve (10) being characterised in that said at least one shutter element (26) of the pilot valve consists of a piston movable with rectilinear motion and kept in a normally closed condition by a thruster element (44) belonging to the actuator device (28) and actuated by an elastic element (46), the force exerted by said at least one wire (30) made from a shape-memory alloy on said at least one shutter element (26) of the pilot valve allowing the elastic force generated by said elastic element (46) to be overcome, so as to take said at least one shutter element (26) of the pilot valve into a partially or a totally open condition.

2. Two-stage valve (10) according to claim 1, characterised in that the actuator device (28) is provided with an electronic control and communication system comprising a control board (32) in turn provided with both respective power supply connections, and with operative connection means (34) with said at least one wire (30) made from a shape-memory alloy, said control board (32) being configured to indirectly obtain determined physical parameters of the fluid through the characteristics of said at least one wire (30), said physical parameters of the fluid being selected from the group consisting of pressure, flow rate and temperature.

3. Two-stage valve (10) according to claim 2, characterised in that the electronic control and communication system is provided with a wireless remote communication module (36), interfaceable via web with remote terminals and/or with portable devices and configured to make available the physical parameters of the fluid on said remote terminals and/or portable devices.

4. Two-stage valve (10) according to claim 1, characterised in that said elastic element (46) consists of a contrast spring operating by compression.

5. Two-stage valve (10) according to claim 1, characterised in that the shutter element (18) of the main valve consists of a piston movable with rectilinear motion and kept under normally closed condition both by the thrusting action of a contrast spring (38), and by the pressure of the fluid flowing in the two-stage valve (10).

6. Two-stage valve (10) according to claim 5, characterised in that the shutter element (18) of the main valve is internally hollow and defines a balancing chamber (40) inside it, wherein the fluid is under pressure when said at least one fluid inlet duct (22) of the pilot valve is kept closed by said at least one shutter element (26) of the pilot valve, and in that the shutter element (18) of the main valve is provided with a membrane (42) that separates externally the main valve body (12) and the pilot valve body (20), the at least partial opening of said at least one shutter element (26) of the pilot valve puts in communication said at least one fluid inlet duct (22) of the pilot valve with said at least one fluid outlet duct (24) of the pilot valve and, therefore, with the fluid outlet duct (16) of the main valve, so as to reduce both the pressure inside the balancing chamber (40), and the closing thrust of said shutter element (18) of the main valve, so that the shutter element (18) of the main valve opens due to the pressure of the fluid contained in the fluid inlet duct (14) of the main valve, causing the fluid flow to pass in the main valve body (12).

7. Two-stage valve (10) according to claim 6, characterised in that the control board (32) is provided with a modulator configured to modulate in amplitude the electric current required to heat said at least one wire (30) made from a shape-memory alloy, so as to obtain the controlled displacement of said at least one shutter element (26) of the pilot valve and, therefore, to obtain controlled variations of the pressure in the balancing chamber (40), in order to proportionally modulate the stroke of the shutter element (18) of the main valve in order to determine different fluid flow rates in the main valve body (12).

8. Two-stage valve (10) according to claim 2, characterised in that the control board (32) is provided with means for detecting the relative position of the thruster element (44), configured to verify the totally or partially open condition, or the normally closed condition, of the pilot valve.

9. Two-stage valve (10) according to claim 8, characterised in that said position detecting means consist of one or more position sensors.

10. Two-stage valve (10) according to claim 8, characterised in that said position detecting means consist of a device for reading the electrical resistance of said at least one wire (30) made of a shape-memory alloy.

11. Two-stage valve (10) according to claim 1, characterised in that it comprises a fluid flow distribution system arranged outside of a pilot chamber (52) that puts in fluid communication, through the interposition of a joining duct (56), the fluid inlet duct (14) of the main valve and said at least one fluid inlet duct (22) of the pilot valve, the fluid flow distribution system in turn comprising a set of external ducts that form a distribution chamber (54), having a substantially circular shape, which surrounds said pilot chamber (52), said distribution chamber (54) being put in fluid connection with an elastic separation membrane (48) on which said at least one shutter element (26) of the pilot valve acts.

12. Two-stage valve (10) according to claim 11, characterised in that it comprises a pair of fluid inlet ducts (22) of the pilot valve, completely independent from one another, a corresponding pair of fluid outlet ducts (24) of the pilot valve, also completely independent from one another, and two distinct shutter elements (26) of the pilot valve, able to be controlled independently and proportionally through the control board (32).

13. Two-stage valve (10) according to claim 12, characterised in that it comprises two wires (30) made of a shape-memory alloy and independently controlled, which act on the respective shutter elements (26) of the pilot valve.

14. Two-stage valve (10) according to claim 1, characterised in that the main valve body (12) is made integral with the pilot valve body (20) and in that said at least one fluid inlet duct (22) of the pilot valve and said at least one fluid outlet duct (24) of the pilot valve are at least partially formed on the main valve body (12).

15. Two-stage valve (10) according to claim 1, characterised in that said at least one wire (30) made of a shape-memory alloy has a section diameter comprised between 20 and 500 micron.

\* \* \* \* \*